UNITED STATES PATENT OFFICE.

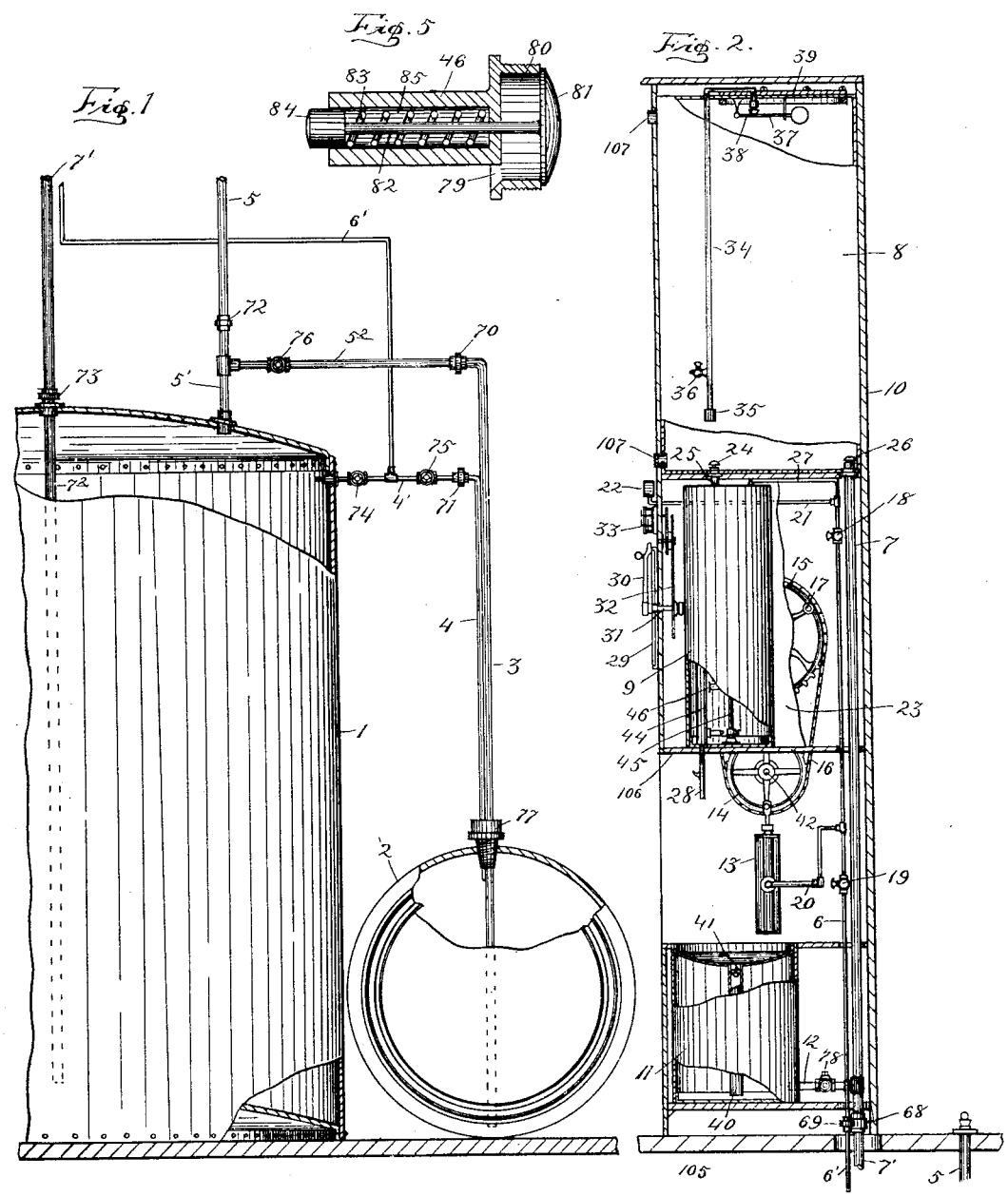

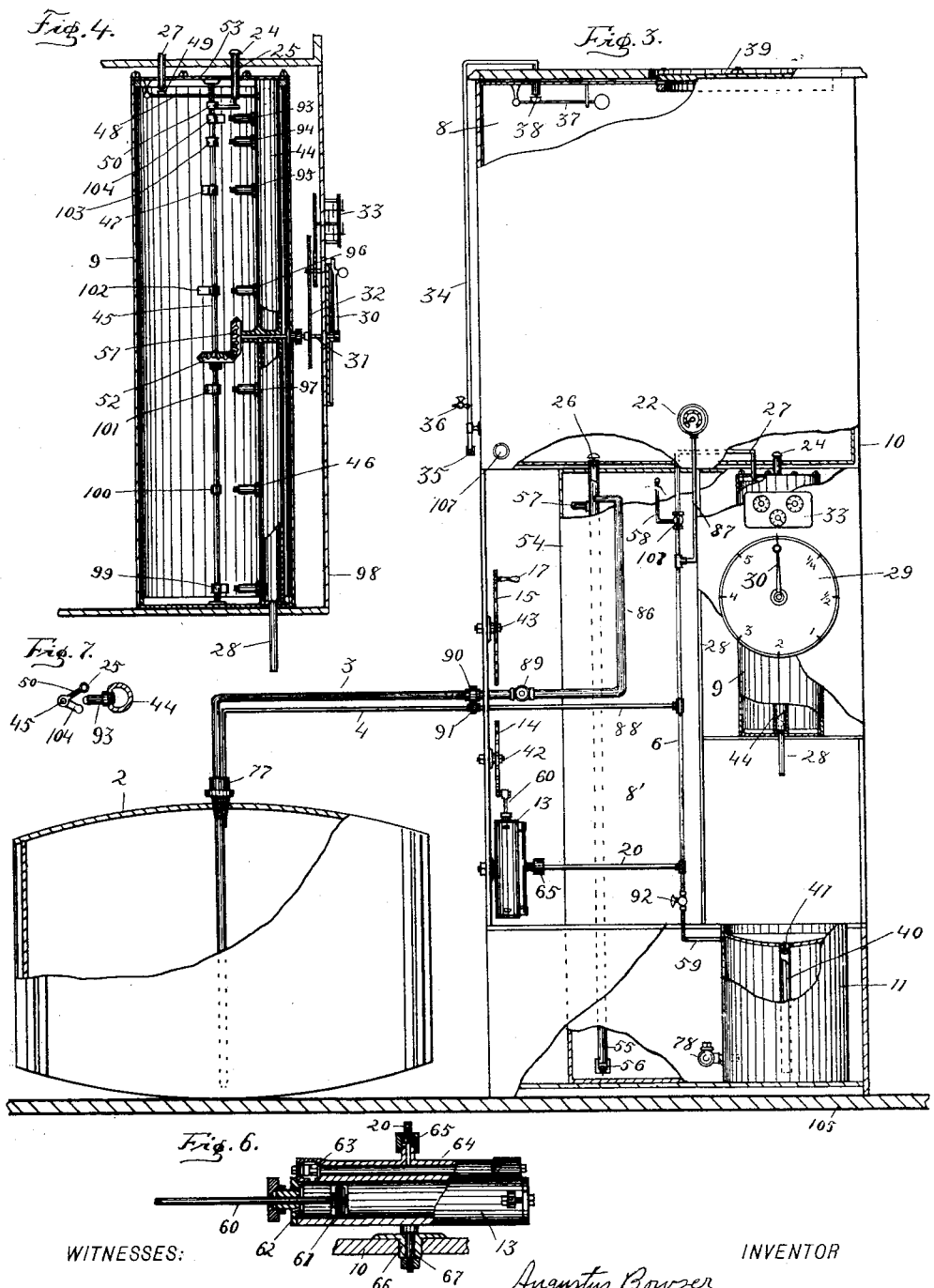

AUGUSTUS BOWSER, OF FORT WAYNE, INDIANA.

AUTOMATIC SELF-MEASURING APPARATUS FOR LIQUIDS.

SPECIFICATION forming part of Letters Patent No. 535,350, dated March 12, 1895.

Application filed November 7, 1894. Serial No. 528,132. (No model.)

*To all whom it may concern:*

Be it known that I, AUGUSTUS BOWSER, a citizen of the United States, residing at Fort Wayne, in the county of Allen, in the State of Indiana, have invented certain new and useful Improvements in Automatic Self-Measuring Apparatus for Liquids; and I do hereby declare that the following is a full, clear, and exact description of the invention, which will enable others skilled in the art to which it appertains to make and use the same, reference being had to the accompanying drawings, which form part of this specification.

My invention relates to improvements in automatic self-measuring apparatus for liquids.

The object of my invention is to provide a simple, convenient, and labor saving self measuring apparatus for storing, measuring and delivering liquids at retail, specially designed and adapted for measuring and delivering kerosene and other oils, so constructed as to secure absolute and infallible accuracy in measurement, convenience and cleanliness in handling, promptness and reliability in its action, small liability of getting out of repair, secure against leakage, evaporation or the escape of disagreeable odors from the liquid containing compartments, which are constantly supplied with fresh air, and so arranged that the contents of the storage and supply tanks can be readily transferred, as needed, to the self measuring receptacle by the use of compressed air.

Another object is to provide a containing, self measuring and delivering apparatus comprising a cabinet which can conveniently be placed behind the retail counter and is adapted to contain both a temporary and a supplementary supply tank, a valved self measuring receptacle, an air pump and the operating mechanism therefor, the said supply tanks being arranged to be readily filled by air pressure, either directly from the barrel or from the storage tank which may be located either in the cellar or at any desired distance therefrom to decrease the danger from fire.

My invention comprises a retailer's cabinet for containing, measuring and delivering oils and other liquids, and its connection with the storage tank or barrel, and my improved method of transferring the oil from the storage tank to the cabinet and from one compartment of the cabinet to the other by means of compressed air.

The novel features of my invention are the mode of elevating the oil or other liquid from the tank to the cabinet, the method of measuring and delivering the liquid from the valved receptacle and the described means for accomplishing the same.

Similar figures of reference indicate corresponding parts throughout the several views.

Figure 1 is a side elevation partly in section of the storage tank for cellar or warehouse, showing a barrel in position for having its contents discharged therein. Fig. 2 is a vertical section of the cabinet containing the supply tank, the automatic measuring receptacle, the drip-pan, the air-pump and other operating mechanism, also showing its connection with the storage tank. Fig. 3 is a front view of Fig. 2 with the addition of a supplementary supply tank. Fig. 4 is an enlarged view of the measuring receptacle in vertical section, showing the self measuring mechanism therein. Fig. 5 is a detail in longitudinal section of one of the measuring receptacle outlet valves and valve body. Fig. 6 is a side view of the air-pump partly in section to show the exhaust chamber and its connections. Fig. 7 is a detail plan of the discharge chamber and the cam mounted operating shaft showing the manner of operating the inlet valve from the supply tank.

Referring now to the construction of the cabinet seen in Fig. 2 and the arrangement for elevating the liquid seen in Fig. 1 the storage tank 1 of any proper form, size or material, of well known construction, and of any desired capacity, is designed to be placed in the cellar, or warehouse containing a vertical outlet pipe $7^2$ connected to the inlet pipe 7 of the supply tank 8, Fig. 2, by the vertical pipe 7' having the couplings 73 and 68 and the inlet drop valve 26 opening into said tank from the pipe 7. The tank 1 is also provided with the short vertical pipe 5' connected to the inlet pipe 5 by the coupling 72 which terminates at the first floor as seen in Fig. 2 for the purpose hereinafter described. Opening into said pipe 5 and connected thereto is the lateral inlet pipe 5 having a stop-cock valve 76, and is connected to the pipe 3 by the coupling 70, the lower end of which passes through the tapering plug 77 in the oil or other liquid barrel 2, and is extended to approximately the lower side thereof. In the side of the said tank 1 at or near the top thereof, is arranged the lateral inlet air pipe 4', into which the air conducting pipe 6' opens, the said lateral pipe 4' having the valves 74 and 75, one on each side of the said pipe 6', and is connected to the vertical air pipe 4, which also enters the side of the said barrel 2 through the said plug 77, and is connected to the pipe 4' by a proper coupling 71. The said pipe 6' also passes up through the floor 105 into the cabinet 10 and is connected to the lower end of the ascending air pipe 6 by a proper coupling 69, and is connected to the air pump 13, Fig. 2, by the outlet air pipe 20 and has its upper end connected with the top of the self measuring receptacle 9 by the inlet air pipe 27, the free end of which enters the top of said receptacle 9, and is provided at said end with the terminal drop valve 49, Fig. 4, which is suspended in any suitable bracket or other proper support. The said pipe 6 is also provided with the stop-cock valves 18 and 19 above and below the said pipe 20 respectively.

That form of the cabinet shown in Fig. 2, has the supply tank in the top or upper portion thereof, the self-measuring receptacle and the other mechanism in the central portion, and the waste or drip pan in the bottom. The said supply tank 8 may be of any desired capacity, though preferably adapted to contain one hundred and twenty gallons, is so arranged that the said cabinet can be conveniently located behind the retail counter. The said storage tank 8 has a manhole 39 in the top thereof, and also has a pivoted float 37 mounted in suitable hangers, and is provided with an external depending air pipe 34 having at its lower end the inlet valve 35 and the stop cock valve 36. The upper end of the said pipe enters the top of the said tank in a vertical direction and is provided with the drop valve 38 adapted to normally rest upon the said float-lever 37 and is operated thereby in a manner hereinafter described. The central portion of said cabinet has a shelf or platform 106 on which is placed the valved self measuring receptacle 9, Fig. 4, having near its front edge the internally arranged vertical discharge chamber 44, opening at the bottom into the discharge pipe 28 and having upon its outer rear face a series of spaced outlet valves adapted to measuring any desired quantity from one quart to five gallons, the construction of the said valves is best seen in Fig. 5, in which the valve body 46 has a central longitudinal opening 85 which is closed at its rear end by the annular lug 84 on the rear end of the valve stem 82 bearing on its front end the valve 81, normally seated on the perimeter of the valve-box 80, provided with the inlet opening 79 and having its said perimeter screw threaded and adapted to be secured in a proper screw threaded perforation in the side of the said pipe 44. The valves 81 are thus located in the said discharge chamber 44 and are securely held in position to their seat by the retracting spring 83 loosely mounted on the said valve stem in the said opening 85. In suitable bearings in the top and bottom of the said measuring receptacle, and preferably in a central position therein, is revolubly mounted the vertical shaft 45, having near its central portion the fixed bevel gear wheel 52, and having also rigidly fixed thereon a series of spaced cams 104, 103, 47, 102, 101, 100 and 99 adapted to open the valves 93, 94, 95, 96, 97, 46 and 98 respectively by engaging the said annular lug 84 on the valve stem 82 in the manner hereinafter described. In the top of the said receptacle 9 is fixed the short vertical pipe 25 on the top of which is seated a proper outlet drop valve 24, having a depending valve stem adapted for engagement with the rigid lug or lateral arm 50 on said shaft 45 which thereby elevates the same.

In a suitable horizontal boxing in the chamber 44, preferably integral therewith but extending beyond the sides thereof, is rotatably mounted the shaft 31, bearing on its inner end the rigid bevel gear wheel 51 adapted to mesh with the said gear wheel 52 on the shaft 45, has the rigid gear-wheel 32 which actuates a train of wheels connected with and comprising the registering apparatus 33, of well known construction designed to register in quarts, the quantity taken from the receptacle 9, and is provided at its outer end with the rigid hand operated index or pointer 30 on the dial 29, arranged on the front face of said cabinet as seen in Fig. 3. It is thus seen that rotating the shaft 31 by means of the said index 30, rotates the same cam bearing shaft 45 and thereby closes the inlet valve 24 and opens the series of spaced measuring outlet valves on the outlet pipe 44 having at the bottom thereof the vertical discharge pipe 28 on which the customer's can or vessel may be suspended. On proper studs 42 and 43 rigidly fixed in the sides of the said cabinet are rotatably mounted the sprocket wheels 14 and 15, respectively, connected by a proper sprocket chain 16, Figs. 2 and 3. The said wheel 14 has a proper lug on the side of its perimeter on which the upper end of the piston rod 60 of the air-pump 13 is pivotally mounted, and the perimeter of the wheel 15 has a lateral operating handle 17, Fig. 3.

The air-pump 13 Fig. 6 is provided with the integral and diametrically opposite lateral studs 67, pivotally mounted in the boxing 66, rigidly fixed in the side of the cabinet 10 and in the stuffing box 65, respectively, rigidly fixed on one end of the pipe 20, in which position the said pump is adapted for an oscillatory movement corresponding with the revolutions of the actuating wheel 14 to which the piston rod thereof is connected. The air-pump cylinder is provided at each end with the inlet valve 62, and the outlet valve 63 opening into the outlet chamber 64 which has lateral communication with the outlet pipe 20 into which there will thus be two exhausts at each stroke of the piston 61, or four exhausts at each revolution of the hand wheel 15. It is obvious that the manner of mounting the said air-pump affords a direct action for the said piston rod without the use of a knuckle joint for the said pump freely oscillates on its axis in conformity to the movement of the wheel 14 to which it is united. The measuring receptacle 9 is separated from that portion of the said cabinet containing the air-pump and operating wheel by the partition 23, Fig. 3, the said portion being open upon the front side to afford access to the operating mechanism. In the bottom of the said cabinet 10 and directly below the end of the discharge pipe 28 is arranged the drip-pan 11 having a closed top and a central and vertical inlet pipe 40, extending nearly to the bottom thereof and provided with an inlet valve 41 in the top thereof, which freely admits the oil but prevents the escape of gas or odor from the said drip pan. The said drip-pan 11 is connected with the said pipe 7 by the lateral outlet pipe 12 having a check valve 78 thereon. The said supply tank 8 is provided upon its front face and near the top and bottom with a bull's eye, that the operator may at any time see if the said tank is full, though he can determine its contents in quarts by consulting the registering apparatus 33.

When it is desired to dispense with the storage cellar tank 1, and discharge the contents of the said barrel 2 directly into the supply tank, the form of the cabinet 10 is slightly modified and its storage capacity increased, as seen in Fig. 3, by providing therein a supplementary supply or temporary storage tank 8' preferably at the rear of the said measuring receptacle 9, has a vertical outlet pipe 55 arranged therein, the upper end of which communicates with the supply tank 8, but is closed by the drop-valve 26, and having at its lower end the inlet drop-valve 56, which permits the contents of the tank 8' to flow into the said pipe 55 under the conditions hereinafter described. In this form of the said cabinet the said pipe 3 is connected to the pipe 86 by the coupling 90; the said pipe 86 being arranged in the said cabinet, its upper end opening into the said pipe 55 at or near its upper extremity and having near its other extremity the stop-cock 89. At any suitable point on the said pipe 55, preferably near the upper end thereof, is fixed a release valve 57 arranged to give way under a ten pound, or other predetermined pressure. The said air pipe 4 is connected to the said vertical air pipe 6 by means of the pipe 88, which is connected to the pipe 4 by the coupling 91. The air-pipe 58 leads from the pipe 6 to the top of the said tank 8', and its junction with the said pipe 6 is arranged a three-way cock 108. In that form of the said cabinet shown in Fig. 2 the pipe 6 is connected to a proper pressure gage 22 by the horizontal pipe 21, and in that form of cabinet shown in Fig. 3, the pipe 6 is connected with the said gage by the air-pipe 87.

The operation of my improvement thus described is substantially as follows: When it is desired to fill the storage tank 1, which may be located in any desired situation from five hundred to one thousand feet distant, the liquid pipe 3 and the air pipe 4 have their lower ends passed through the said plug 77 in the barrel 2, and are then connected to the pipes $5^2$ and 4' respectively, by the couplings 70 and 71. The operator now closes the stop-cock valve 18 on the air pipe 6 and opens the stop-cock valve 19 on said pipe. He then operates the oscillatory air-pump 13 by means of the hand-wheel 15 and its connections, which forces the compressed air through the air pipes 20, 6, 6', 4', and 4 into the said barrel 2, which thereby, under a proper pressure, forces the liquid contents of said barrel up through the pipes 3 and $5^2$ and into the said tank 1, through the short vertical pipe 5'. When the tank 1 is thus filled, the pipes 3 and 4 may be removed and the free ends of the pipes 4' and $5^2$ are properly capped. To fill the supply tank 8', the operator now closes the stop cock 75 and opens the stop cock 74 on the said pipe 4', when by means of the pump 13, as before, he forces the air under proper pressure into the top of the tank 1, which thereby forces the contents of said tank upward through the vertical pipe $7^2$ 7', and 7, and the drop valve 26 into the said supply tank 8, the stop-cock valve 36 on the said external pipe 34 being open to permit the escape of the air in the tank 8, when the same is being filled. It is obvious that when the tank 8 is full the float lever 37 will automatically close the drop-valve 38 in the upper end of the pipe 34 and prevent leakage of the oil or other liquid contents, into the said pipe 34, and also that when the tank 8 is full, the valve 26 will be automatically closed. It is obvious that the amount of air pressure in the pipe 6 can at all times be readily and conveniently determined from the pressure gage 22.

To fill the self measuring receptacle 9 the index or pointer 30 is set on the dial plate 29 in an upwardly pointing vertical position, as seen in Fig. 3, which thereby brings the lever arm 50 on the shaft 45 into engagement with the lower end of the stem of the said valve 24, and opens the same for the admission of the liquid contents of the tank 8 to the said receptacle 9. Both the lower end of the said valve stem and the free end of the said lever arm 50 are rounded, as seen in Fig. 7, and so arranged that by engagement, the said valve stem is elevated and the valve 24 held open so long as the index 30 remains in said position.

When it is desired to draw off any determined quantity the operator turns the index hand 30, until it rests upon the point on said dial indicating the said quantity, thereby opening that one of the series of outlet valves on the outlet chamber 44 which measures the desired quantity by its engagement with its corresponding cam on the shaft 45. For example to draw off and accurately measure one gallon, the said index hand is turned round upon the dial 29 until it reaches figure 1. The valve 24 will now be closed by its own weight, as its stem is no longer upheld by the cam 50, and the outlet valve 95 will be held open by its engagement with the cam 47 on the shaft 45, until all the oil or other liquid in said receptacle above the said valve is withdrawn through the chamber 44 and the discharge pipe 28, when the index hand is returned by the operator to its normal position, as shown, with the valve 24 again open by the engagement of the said cam 50 with its stem as described. In a like manner, by the use of my self measuring receptacle 9 any desired quantity of liquid contents from one quart to five gallons can be automatically and accurately measured and conveniently withdrawn. It is obvious that when the said liquid is thus being withdrawn the drop valve 49 will automatically open for the admission of air by the lowering of the float lever 48. The check valve 41 in the top of the pipe 40 in the drippan 11 prevents the escape of gas or odor therefrom or loss by evaporation, and the check valve 78 in the outlet pipe 12 permits its contents to return to the storage tank 1 through the pipe 7 and its connections.

When the tank 1 is not employed and the cabinet 10 is preferably provided with the supplimentary supply tank 8′, in which case the contents of the barrel 2 are discharged directly into the supply tank 8, through the pipes 3, 86 and 55 when the stop-cock 89 being first opened to permit its flow and the drop valve 26 being held open by the pressure of the inflowing liquid. When the said supply tank 8 is thus filled the release valve 57 will open under a predetermined pressure when the said tank 8′ can then be filled from the pipe 86 through said valve. The pipes 3 and 4, Fig. 3 are then removed and the outer ends of the pipes 86 and 88 properly capped. When the said tank 8 is emptied it can readily be refilled from the said tank 8′, by again closing the said valve 57, setting the three way cock 108 in such a manner as to open a communication to the pipe 6 and the air pipe 58 leading to the top of the said tank 8, when by means of the compressed air from said pump on the upper surface of the liquid in the tank 8′, its contents can be readily forced up into the said tank 8 through the outlet drop valve 56 into the vertical pipe 55 and through the said drop valve 26 until the tank 8 is filled, when the valve 26 will of course again automatically close; and should the operator continue the said operation after the tank 8 is filled, the release valve 57 will again give way and no injury or inconvenience can result.

By opening the stop cock 92 on the pipe 6 and properly setting the three way valve 107 the contents of the drip-pan 11 can be forced out through the check valve 78 by means of compressed air through the pipe 59 which enters said pan near the top thereof.

It is obvious that when the tanks 8 and 8′ have been filled, the three way cock 108 should be so set as to permit the air to freely escape from the receptacle 9 when the same is filling and should be so left until it is desired to replenish the supply tank 8.

It is obvious that my improved self measuring apparatus can be used with equal facility for all kinds of liquids, and that when used in measuring slow flowing liquids such as molasses and sirups, their delivery to the customer's vessel can be greatly expedited by properly adjusting the said three-way cock and throwing a temporary air pressure in the top of the said receptacle 9 through the pipe 27. While the registering apparatus 33 can be omitted without seriously impairing the efficiency of my invention, I prefer its employment.

Having thus described my invention and the manner of employing the same, what I desire to secure by Letters Patent is—

1. An automatic self measuring apparatus for liquids comprising a cabinet having in the top thereof a supply tank provided with a valved connection with the atmosphere, as shown, and being connected with the storage tank by a valved inlet pipe, and having in its central portion a measuring receptacle provided with a vertical discharge chamber having a proper discharge pipe, and a series of spaced outlet valves arranged thereon, as described, a valved connection with the compressed air supply, and an inlet valve in the top thereof communicating with the supply tank, a vertical rotatable shaft having a series of rigid cams adapted to engage and open the said inlet valve and the said spaced measuring valves, a horizontal rotatable shaft mounted in the discharge chamber carrying on its outer end a rigid index finger arranged upon a measured dial as shown, and having on its inner end a bevel gear connection with the said vertical shaft, and a proper air pump, in said cabinet having suitable means for operating the same, and being connected by suitable pipes with the said receptacle and the said tanks, all substantially as described.

2. In an automatic self measuring apparatus for liquid a cabinet having in its upper portion a supply tank provided with a valved connection with the storage tank, a measuring receptacle arranged in said cabinet below the said supply tank having a vertical discharge chamber and series of spaced measuring valves arranged thereon, as described, a valved connection with the compressed air supply, and an inlet valve in the top thereof communicating with the supply tank, a vertical rotatable shaft having a series of rigid cams adapted to engage and open the said inlet valve and the said measuring valves, a horizontal shaft mounted in said discharge chamber having on its outer end a rigid index finger arranged upon a proper dial, as shown, and having upon its inner end a bevel gear connection with the said vertical shaft for the purpose of rotating the same, an air pump 13 mounted as shown, adapted for an oscillating motion, and the actuating sprocket wheels mounted as shown, and having a pivotal connection with the said pump for operating the same, all substantially as described.

3. The combination in an automatic self measuring apparatus for liquids, of a cabinet 10 having a supply tank 8 provided with a valved connection with the atmosphere by means of the valve 38 in the pipe 34 and the lever 37, and having a communication with the storage tank 1 by means of the pipe 7 and the valve 26, the said cabinet having upon its front face the registering apparatus 33, and the spaced dial 30, a measuring receptacle 9 mounted in said cabinet, as shown, having a vertical discharge chamber 44, and a series of vertically arranged measuring valves arranged on said chamber as described, the said receptacle having a valved connection with the compressed air supply by means of the pipe 27, having the valve 49 therein, and the operating lever 48, an inlet pipe 25 from the said tank 8 having the valve 24 in the upper end thereof, and a vertical rotatable shaft 45 having a series of rigid cams adapted to engage and open the said outlet valve 24 and the said measuring valves, a horizontal rotatable shaft 31, mounted as shown, having on one end the index point 30 and on the other end a bevel gear wheel 51 adapted to rotate the said shaft 45 by engaging the rigid gear wheel 52 thereon the air-pump 13 mounted as shown and adapted for an oscillating motion, the actuating sprocket wheels 14 and 15 arranged, as described, and having a pivoted connection with the said pump for operating the same, and the drip-pan 11 having the valved inlet pipe 40 and connected with the compressed air supply, as shown, all substantially as described.

4. The combination of the cabinet 10 having a supply tank 8 provided with the air pipe 34 having the valves 35 and 38 and the operating lever 37, and the tank 8 connected with the tank 8' by means of the outlet pipe 55 having the valves 26, 56, and 57, and the inlet pipe 86, the said cabinet having the registering apparatus 33 and the spaced dial arranged as shown, a measuring receptacle 9 having a discharge chamber 44 an inlet pipe 25 from the said tank 8 having a valve 24, and a series of vertically spaced outlet valves, as described, a valved connection with the compressed air supply by means of the pipe 27 having the valve 49 therein, and the operating lever 48, the rotatable shaft 45 having a series of rigid cams adapted to engage and open the said inlet valve 24, and the spaced measuring valves on said chamber, a horizontal rotatable shaft 31 mounted as shown, provided at one end with the index 30, and on the other end with a bevel gear wheel 51 adapted to rotate the said shaft 45 by engaging the rigid gear 52 thereon, the air-pump 13 connected with the tank 8, the receptacle 9, and drip-pan 11, as described, the sprocket wheels 14 and 15 having a pivotal connection with the said pump for operating the same, substantially as described.

5. In an apparatus for measuring liquids, an automatic self-measuring receptacle 9 having a vertical discharge chamber 44 and a series of spaced inlet valves on said chamber, as described, the said receptacle having a valved connection with the compressed air supply, as shown, a vertical rotatable shaft 45 provided with a series of measuring valves, the rotatable horizontal shaft 31 mounted as shown, having on one end the index finger 30 and on the other end a bevel gear wheel 51 adapted to rotate the said shaft 45 by engaging the rigid bevel gear 52 thereon, all substantially as described.

Signed by me, at Fort Wayne, Allen county, Indiana, this 31st day of October, 1894.

AUGUSTUS BOWSER.

Witnesses:
GEORGE F. FELTS,
WALTER G. BURNS.